United States Patent [19]

Futami et al.

[11] Patent Number: 5,160,772

[45] Date of Patent: Nov. 3, 1992

[54] COMPOSITE MOLDED ARTICLES

[75] Inventors: Takashi Futami, Zushi; Tatsuhiko Iwamoto, Tokyo; Seijiro Okamura, Hokohama, all of Japan

[73] Assignee: Nippon Zeon Co., Ltd., Tokyo, Japan

[21] Appl. No.: 690,038

[22] Filed: Apr. 23, 1991

[30] Foreign Application Priority Data

Apr. 23, 1990 [JP] Japan .................................. 2-107268
Apr. 23, 1990 [JP] Japan .................................. 2-107269
May 17, 1990 [JP] Japan .................................. 2-125491

[51] Int. Cl.⁵ ................................................ B32B 1/04
[52] U.S. Cl. ......................................... 428/71; 428/76; 428/99; 428/318.8
[58] Field of Search .................. 428/71, 76, 99, 318.8; 441/74

Primary Examiner—Alexander S. Thomas
Attorney, Agent, or Firm—Thoburn T. Dunlap

[57] ABSTRACT

Integrally molded lightweight composite articles having a foam core and a ring-opened polynorbornene outer layer are prepared by placing a low forming ratio foam core having an integral outer skin in a mold and polymerizing a norbornene type monomer around the core.

17 Claims, 2 Drawing Sheets

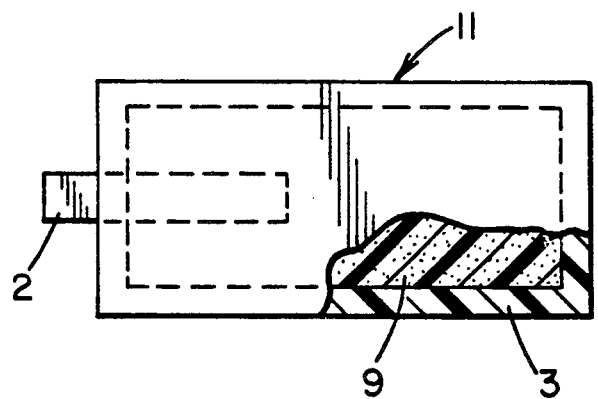
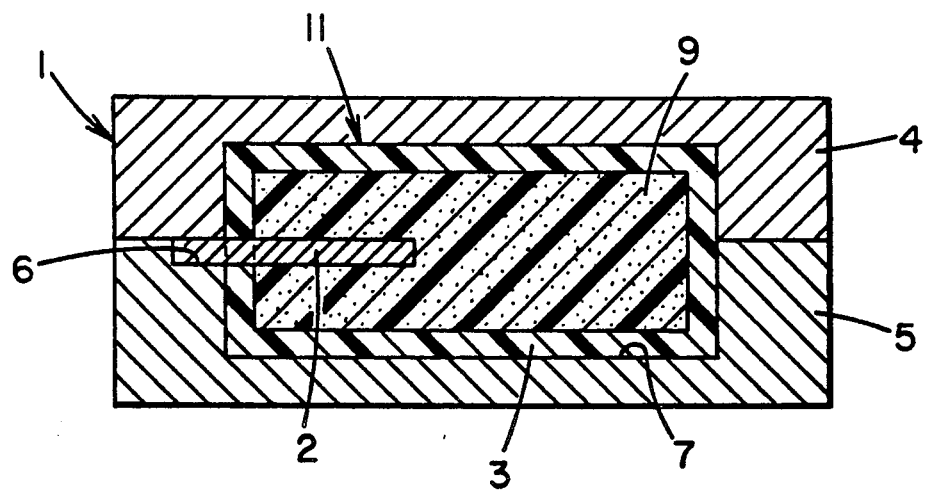

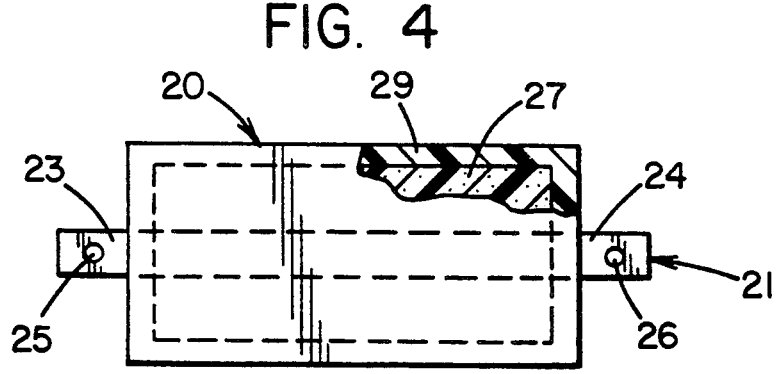
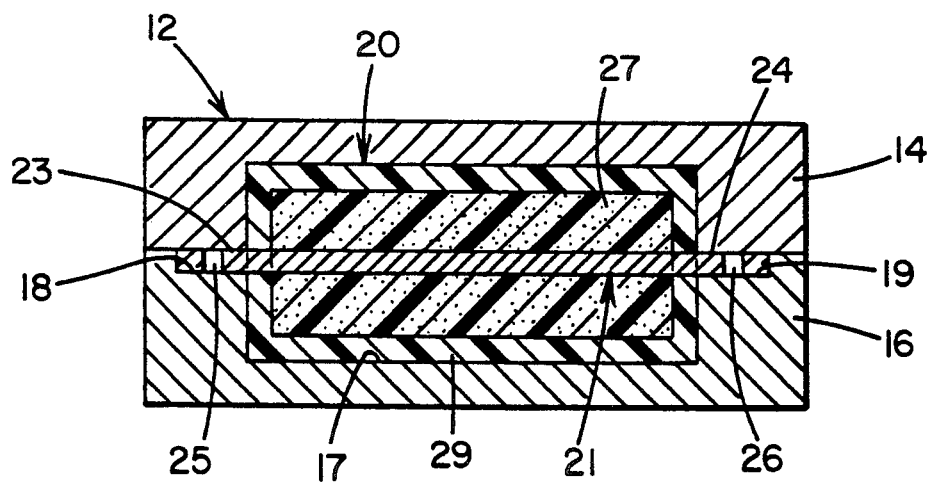
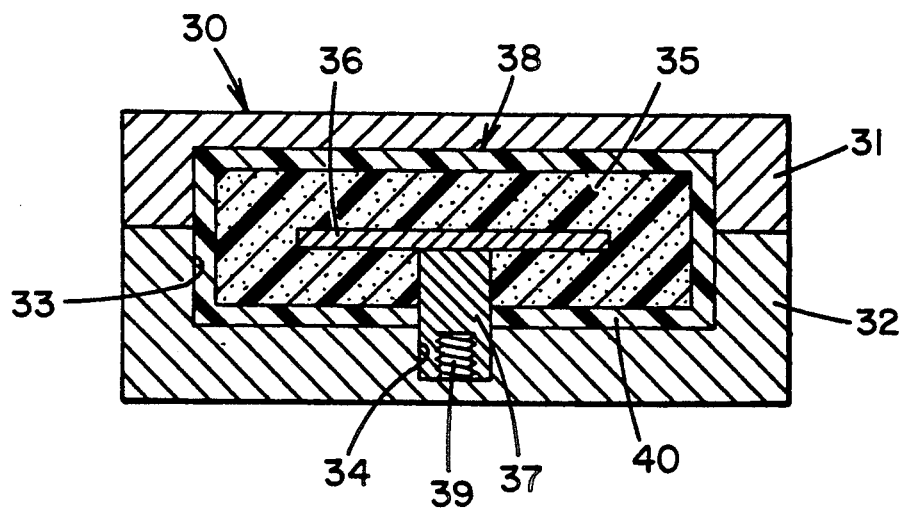

COMPOSITE MOLDED ARTICLES

BACKGROUND OF THE INVENTION

1. Technical Field

This invention pertains to integrally molded composite articles. More particularly, this invention relates to integrally molded composite panels comprising a foamed plastic core and a polynorbornene outer layer. The polynorbornene outer layer is composed of at least one norbornene type monomer which is polymerized around the core material via ring-opening bulk polymerization.

2. State of the Art

Composite molded products consisting of a foam core and an outer layer of unsaturated polyester, epoxy resin, phenolic resin, polyurethane resin, and the like are lightweight and, therefore, are often used in the production of leisure goods such as sailboards, surf boards, boats, and ores.

These composite products are manufactured by manually winding reinforcing fibers such as glass fibers around a foam core and applying a thermosetting resin to the core-fiber composite, followed by curing (also known in the art as the hand lay-up method). This method is unsuitable for mass production because of the intensive manual labor involved.

In another method, a foam core is wrapped with glass, carbon, or aramid fibers, and placed in a mold. A liquid thermosetting polymer is conveyed to the mold and thermally cured to prepare a composite molded product as disclosed in Japanese Kokai application Ser. No. 63-16220. In this method, evenly wrapping the core with reinforcing fibers is difficult. In the case of glass fibers, broken fiber pieces tend to prick hands, face, and body, creating an uncomfortable work environment. Furthermore, when a reinforcing fiber wrapped foam core is placed in a mold and a thermosetting type monomer is polymerized thereabout, the resulting product has a weak outer layer because of the lack of reinforcement therein. For sufficient strength, a costly epoxy resin must be used.

When reinforcing fibers are used in the outer layer, the reinforcing material tends to be exposed at or slightly below the surface of the molded product, making it difficult to obtain a smooth surface.

When dicyclopentadiene is bulk polymerized in a mold in the presence of a metathesis catalyst, a molded product with high rigidity and high impact strength is obtained. In this way, a large molded product is readily manufactured. In an attempt to prepare an integrally molded composite with a foam core and an outer polynorbornene layer, the present inventors placed a precast foam block (that was sliced or cut to a desired shape and size) into a mold. A low viscosity reaction solution containing a norbornene type monomer was conveyed to the mold under low pressure and polymerized. Due to the low molding pressure, the foam core was not damaged or deformed in the molding process. An integrally molded (non-reinforced) composite with good strength was obtained. However, when large molded composite products are manufactured in this manner, the surface of the product often has voids, indentations and bumps. Moreover, when a foam core with a high foaming ratio is used, intimate bonding between the core material and outer layer is not achieved. Consequently, wavy defects appear in the product.

Accordingly, there is a need for a strong, lightweight integrally molded composite product without any surface defects.

SUMMARY OF THE INVENTION

It is an object of the present invention to provide a lightweight integrally molded composite article having a foam core portion and a polynorbornene outer layer wherein the surface of the outer layer is free of defects.

Another object is to provide a strong, lightweight integrally molded composite article without the use of reinforcing fibers in the outer layer.

A further object of the invention is the provision of a reinforced core portion that eliminates the stress cracking phenomenon associated with prior art metal insert reinforced polynorbornene articles.

Still another object of the present invention is the provision of a molded composite having an integral fastening system.

These and other objectives are achieved in part by providing an integrally molded composite comprising a foam core member with a polynorbornene outer layer. The core member is composed of a low foaming ratio plastic foam having an integral skin on its periphery. The integrally molded composite article is prepared by placing the core member into a mold cavity and conveying a reactive monomer solution comprising at least one norbornene type monomer and a metathesis catalyst into the mold cavity, and bulk polymerizing the reaction solution around the core member.

BRIEF DESCRIPTION OF THE DRAWINGS

FIG. 1 is a side elevational view in cross-section of a mold and integrally molded composite of the present invention.

FIG. 2 is a top plan view of the integrally molded (non-reinforced) composite obtained from the mold shown in FIG. 1.

FIG. 3 is a side elevational view in cross-section of a mold for obtaining a reinforced integrally molded composite of the present invention.

FIG. 4 is a top plan view of the integrally molded composite obtained from the mold shown in FIG. 3 with support member, extension member, and fastener means.

FIG. 5 is a side elevational view in cross-section of a mold and integrally molded composite product with the fastener means of the present invention.

DETAILED DESCRIPTION

Foam Core

The core of the integrally molded composite product of the present invention is a low foaming ratio foamed plastic (foam core) with an integral skin on its periphery. By using a core having a low foaming ratio and integral skin, a large, lightweight yet high strength molded product without voids, indentations, ripples, or bumps is obtained. Foaming ratio as employed herein is defined as:

$$\text{Foaming ratio} = \frac{\text{density of non-cellular polymer}}{\text{density of cellular polymer}}.$$

Any foamed plastic having the above-described properties and which retains its original shape can be used as the core material. The foam core is prepared from virtually any organic polymer having a cellular core with an integral skin on its periphery (all surfaces) or substantially on its periphery. The skin is relatively non-porous (substantially non-cellular) in relation to the cellular core. By the phrase "substantially on its periphery" is meant that the integrally formed skin covers the periphery of the core or a substantial portion thereof. For example, if the core is cut or shaped to a desired configuration, it is readily apparent that the surface to which the cut was made (and material removed) would be devoid of skin, thusly exposing the cellular core.

Examples of foamed plastics suitable for core materials include: polyurethanes, polyethylenes, polypropylenes, polystyrenes, urea thermosetting acrylic polyimides, polyvinyl chloride, and the like. Among the thermoplastic foam core materials, polyurethane or cross-linked polyethylene are preferred.

Methods of making foam materials are well known in the art. Exemplary methods are set forth in The Modern Plastics Encyclopedia, 1982-83, Volume 59, No. 10A, pages 275 to 278; The Kirk-Othmer Encyclopedia of Chemical Technology, 3rd Edition, Volume 11, pages 82 to 126 which are incorporated herein by reference. See also U.S. Pat. Nos. 4,588,754; 4,752,625; and 4,855,096 which are herein incorporated by reference in their entirety. Generally, a foamed core is molded to a desired configuration by conveying a foaming polymer or polymer precursor material into a mold of a specified configuration, and then curing the material. For example, in the preparation of a polyurethane core, a polyurethane reaction solution containing a foaming agent is injected into a mold cavity via reactive injection molding (RIM). The material adjacent to the surface of the mold forms a non-foamed (e.g., non-cellular) skin (i.e., the material in contact with the mold surface forms a solid skin with no cell development). The foaming agent expands the remaining material to fill the mold cavity and form a cellular core. This process produces a foam core with integral skin that is free of voids and blemishes and has a smooth finish.

When a preformed foam material is either sliced or cut to a certain configuration and utilized as the core material, the obtained molded composite product exhibits indentations and bumps. A flat, smooth, large composite product is not achieved. Similarly, a foam material produced by extrusion or casting that is devoid of a skin is unacceptable for this purpose. However, when utilizing a sheet-like or plate-like foam core, the sides of the core can be devoid of the skin layer.

The foamed plastic must have a low foaming ratio. Particularly, the foaming ratio must be about 5 to about 15. If the foaming ratio exceeds about 15 (i.e., about 20), the molded composite product will have an unexceptably wavy surface. Moreover, the foam core/outer layer interface will be weak and have a tendency to peel thereby negating the reinforcing effect of the core.

In one embodiment of the invention (e.g., in some panel configurations), the length and width of the foam core can be of the same dimensions (i.e., length and width) as the integrally molded composite product (which is defined by the size of the mold), but the core thickness should be less than the thickness of the polynorbornene outer layer. However, in other embodiments (including panels) the core dimensions (i.e., length, height, and width) are smaller than the dimensions of the integrally molded composite product (defined by the size of the mold).

In still another embodiment, the foam core of the invention can be reinforced with a structural insert (support member) for support. Preferably, the support member is metal but for purposes of the present invention may be any material that is rigid and provides reinforcing support to the integrally molded composite, e.g., wood, plastic, and the like.

The support member can be of any configuration so long as its dimensions (i.e., length, height and width) allow it to be encapsulated within the foam core. The support member can be configured as rods, bars, plates, sheets or any configuration that conforms to the shape of the integrally molded composite. Electronic components such as coils, capacitors, and the like also can be introduced within the foam core.

The foam encapsulated support member is advantageous in that it is resistant to shrink stress. As the reaction solution is polymerized around the reinforced core during the molding operation, the forming outer layer matrix tends to shrink slightly as the polymerization reaction progresses, and conversion of monomer to polymer increases. The foam around the support member (being resilient) is able to compress as the polymer matrix shrinks around the support member, thereby functioning as a shrinkable buffer that alleviates the shrink stress on the support member. On the other hand, if the support member is not buffered against shrinkage, it may deform and cause the surrounding outer polynorbornene layer to distort. In severe cases the outer polynorbornene layer may crack or rupture.

The reinforced foam core elements of this embodiment can be made by placing the support member in a mold and molding the foamed plastic around it in the same manner as previously described for nonreinforced foam core members. Alternatively, the support member can be physically inserted into the foamed core of the invention.

In still another embodiment of the invention, the integrally molded composite is provided with integral fastening means thereon. If the integrally molded composite of this invention is to be configured as panels, partitions, display boards, or leisure products (e.g., surfboards, bodysurf boards, sailboards, skateboards, boat hulls, and the like) fastening means integrally molded into the composite thereon would be advantageous. Accordingly, the support member is provided with an extension that protrudes outwardly from the support and through the core. As the outer layer is polymerized around the core with outwardly protruding extension, the extension becomes integrally molded into the outer layer. The extension is configured to protrude to the surface of the outer layer. The distal end of the extension (i.e., the end opposite the core) is provided with fastening means. Suitable fastening means at the distal end of the extension include but are not limited to apertures, threaded apertures for receiving bolts and studs, studs, dowels, bolts, and the like. The extension can be an extension of the support member (i.e., integrally formed therewith) as shown in FIGS. 3 and 4 or can be retrofitted on to the support member by any attachment means as shown in FIG. 5 (attachment means not shown). Alternatively, an extension (without attached support) with fastener means at its distal end can be inserted into the foam core.

Suitable extension materials include metals such as aluminum, and the like, wood, thermosetting polymers such as polynorbornene, polyesters, epoxies, and the like.

The shape of the extension is not critical so long as it can accommodate the fastening means and be adaptable for attachment to the support member (when desired). The extension can be an integral part of the support member or can be retrofitted thereto. Any suitable means for securing the extension to the support member can be utilized so long as the extension remains secured to the support during the molding operation and through subsequent use of the integrally molded composite. Suitable means for attaching the extension to the support member include but are not limited to welding, bolting, riveting, screwing, and the like.

Core Placement

According to the method of this invention, the foam core (reinforced or unreinforced) is placed in a mold cavity of a desired configuration such that a gap is formed between the core member and the inside wall of the mold cavity. In some composite configurations, at least one of the core sides can (if desired) extend up to the mold side wall with the proviso that the top and bottom surfaces of the core remain sandwiched between the polynorbornene outer layer. The mold is filled with a reaction solution comprising at least one norbornene type monomer and a metathesis catalyst system. The solution is then polymerized via metathesis ring-opening bulk polymerization, resulting in the formation of a polynorbornene outer layer.

To create the gap between the foam core member and the inside wall of the mold cavity a spacer(s) is placed between the core member and the mold cavity wall. The spacer stabilizes the core member (e.g., prevents it from moving or floating) when the reaction solution is conveyed into the mold cavity. The spacer(s) also provides an even gap between the core member and the mold cavity wall, resulting in a polymer layer of even thickness around the core.

The spacer can be adhesively bonded to the core member, imbedded into the core member or secured to the core member with a rubber band. The spacer also can be integrally molded as part of or into the core member. The spacer can be of any configuration so long as it does not deviate from the purpose of the invention. The spacer can be made of a synthetic resin, elastomer, or metal.

In embodiments wherein the core member is provided with an extension with fastening means thereon, the extension member can be utilized as a means to provide the gap between the core member and mold cavity wall as will be shown in the accompanying drawings.

Referring to the drawings wherein like reference numerals refer to like elements in the different views, there is shown in FIG. 1 a mold 1 having an upper mold half 4 and a lower mold half 5. Upper and lower mold halves 4 and 5 define a mold cavity wall 7. The lower mold half 5 has a channel-like recess 6 that opens into a mold cavity (shown with molded composite 11 therein) that is defined by mold cavity wall 7. Recess 6 is essentially of the same thickness and width as a spacer element to be later identified. In operation, foam core 9 (with or without a support member) having a spacer element 2 in one end thereof is placed into lower mold half 5 wherein spacer element 2 is intimately received into recess 6. Upper mold half 4 is mated to lower mold half 5 thereby clamping spacer element 2 therebetween. Core member 9 and spacer element 2 are configured (and the placement of recess 6) to provide an even gap (not shown) defined by the surface of core member 9 and mold cavity wall 7. A reaction formulation is conveyed into the gap through an injection port (not shown).

Referring to FIG. 2, there is shown an integrally molded composite 11 with a foam core 9 (shown without a support member) and a polynorbornene outer layer 3. The protruding portion of spacer element 2 can be removed by cutting it flush with the surface of outer layer 3. Several spacers can be installed in the above-described manner depending on the configuration desired.

Another embodiment of the invention is illutrated in FIGS. 3 and 4. In FIG. 3 there is shown a mold 12 having upper and lower mold halves 14 and 16, respectively, that define a mold cavity wall 17. The lower mold half 16 has channel-like recesses 18 and 19 that open into a mold cavity (shown with molded composite 20 therein) that is defined by mold cavity wall 17. Recesses 18 and 19 are essentially of the same thickness and width as extension members to be later identified. Foam core 27 with a support member 21 encapsulated therein and having extension members 23 and 24 which are integral with and protrude from support member 21 is placed in mold half 16. Extension members 23 and 24 are intimately received into recesses 18 and 19. Upper mold half 14 is mated to lower mold half 16 thereby clamping extensions 23 and 24 therebetween. On the distal ends of extension members 23 and 24 are located fastening apertures 25 and 26. Core member 27 and extension members 23 and 24 are configured (and the placement of recesses 18 and 19) to provide an even gap (not shown) defined by the surface of core member 27 and the mold cavity wall 17. A reaction solution is conveyed into the gap through an injection port (not shown).

Referring to FIG. 4 there is shown integrally molded composite 20 with foam core 27 and polynorbornene outer layer 29. Support member 21 with integral extensions 23 and 24 provides reinforcement to the molded composite 20. On the distal portions of extensions 23 and 24 are shown fastening apertures 25 and 26.

A further embodiment of the invention is depicted in FIG. 5. In FIG. 5 there is shown a mold 30 having an upper mold half 31 and lower mold half 32. Upper and lower mold halves 31 and 32 define a mold cavity wall 33. Lower mold half 32 has a recess 34 that opens into a mold cavity (shown with molded composite 38 therein) that is defined by mold cavity wall 33. Recess 34 is of a specified depth and of essentially the same width as an extension member to be later identified. Foam core 35 with encapsulated support member 36 having attached extension member 37 is placed in lower mold half 32 such that extension member 37 is intimately received into recess 34. Upper mold half 31 is mated to lower half 32. Extension member 37 is configured and recess 34 is of a depth and placement so as to provide an even gap (not shown) defined by the surface of foam core 35 and the cavity wall 33. At the distal end of extension 37 there is a recessed threaded aperture 39. An outer polynorbornene layer is defined by numeral 40.

Molding Operation

Following the placement of the foam core member into the mold cavity, a reactive solution comprising at least one norbornene type monomer, a metathesis catalyst (catalyst system), and optional additives are conveyed into the mold and allowed to fill the gap formed between the core surfaces and the mold cavity wall.

The reactive solution is then bulk polymerized (via ring-opening polymerization) around the periphery of the core. Following the polymerization reaction (after allowing for sufficient cooling), an integrally molded composite of an inner core member and outer polynorbornene layer is removed from the mold.

In molding the integrally molded composites of the present invention, reaction injection molding (RIM) is preferred. In the RIM process, a norbornene type monomer solution is divided into two portions and placed into two separate containers. A metathesis catalyst is added to one of the containers and a cocatalyst is added to the other container to prepare two stable reactant solutions which are stored under inert atmospheric conditions. In the molding operation, the two reactant solutions are mixed to obtain a reactive solution that is conveyed to a mold of a desired configuration where the polymerization is carried out, i.e. the reactant streams are conveyed to the head of an impingement mixing device and instantly mixed. The reaction solution is then injected into a preheated RIM molding apparatus and bulk polymerized in the presence of the foam core to obtain the integrally molded composite. This invention is not limited to two reactant streams. Additional streams can be provided for the addition of other components to the reaction solution.

Besides an impingement mixer, a dynamic or static mixer can be employed as low pressure feeders. After mixing, the reactive solution can be conveyed (e.g., poured or injected) into a preheated mold in several portions (batch feeding) as disclosed in Japanese Kokai application No. 59-51911 and U.S. Pat. No. 4,426,502. Alternatively, the reactive solution can be injected in a continuous mode.

The apparatus utilized in the latter embodiment is compact in comparison to an impingement mixing device. Additionally, the latter devices can be operated under lower pressure parameters. Furthermore, the injection rate can be lowered when utilizing large amounts of filler materials, allowing the homogeneous impregnation of reaction solution into the filler materials.

The mold pressure is selected so as to not damage the core material. Generally, the mold pressure in the range of about 0.1 to about 10 $kg/cm^2$, and more preferably about 5 $kg/cm^2$ is employed. The mold temperature employed ranges from about 10° to about 150° C., preferably about 30° to about 100° C. The polymerization time is generally less than 20 minutes and, preferably, about 5 minutes or less.

The integrally molded composites of the present invention can be molded to any desired configuration, e.g., rectangular, square, circular and the like; or as in the case of leisure products, to the configuration of sailboards, skateboards, surf boards, bodysurf boards, boat hulls and the like. There is no restriction as to the choice of mold materials, but low melting aluminum alloy molds are widely used.

The thickness of the core can range from about 2 to about 20 mm or more depending on the end use of the composite material. The thickness of the outer layer can range from about 2 mm or more again depending on the end use of the composite. The outer layer should be of greater diameter than the core member. The integrally molded composites of the present invention can be utilized as panels for display boards; structural panels such as for office partitions; boat hull construction; surf boards; skateboards, and the like; tables; or any other use that requires a lightweight but strong panel-like composite.

Norbornene Type Monomer

The norbornene-type monomer employed in this invention can be any ring-opening metathesis polymerizable monomer having a norbornene ring. Examples of norbornene-type monomers are bicyclic monomers such as 2-norbornene, norbornadiene, 5-methyl-2-norbornene, 5-ethyl-2-norbornene, 5-butyl-2-norbornene, 5-hexyl-2-norbornene, 5-ethylidene-2-norbornene, 5-vinyl-2-norbornene, 5-phenylnorbornene, and the like; tricyclic monomers such as dicyclopentadiene or dihydrodicyclopentadiene, and the like; tetracyclic monomers such as tetracyclododecene, methyltetracyclododecene, ethyltetracyclododecene, dimethyltetracyclododecene, ethylidenetetracyclododecene, and the like; pentacyclic monomers such as tricyclopentadiene and the like; and heptacyclic monomers such as tetradicyclopentadiene and the like. The alkyl (e.g., methyl, ethyl, propyl, butyl, and the like), alkylidene (e.g., ethylidene, and the like), aryl (e.g., phenyl, tolyl, naphthyl, and the like) and polar (e.g., ester, ether, nitrile, halogen groups, and the like) derivatives of the foregoing monomer types are also within the scope of this invention. The monomer can be used alone to obtain a homopolymer product or two or more can be mixed to obtain a copolymer product. Due to the greater availability, reactivity and heat resistance, bicyclic and pentacyclic monomers are preferred.

For integrally molded composite products with high thermal deformation temperature properties, tricyclic or higher polycyclic norbornene monomers are preferred. It is also desirable for the polynorbornene outer layer to be a thermosetting polymer. For this reason, it is preferred that a cross-linking type norbornene-type monomer is employed. Suitable cross-linking monomers are any polycyclic norbornene type monomer containing two or more reactive double bonds, such as dicyclopentadiene, tricyclopentadiene, tetracyclopentadiene, and the like. If a norbornene type (homo) monomer is a cross-linking monomer, the use of other cross-linking comonomers are not necessary.

A monocyclic olefin can be mixed with the foregoing monomers so long as the properties of the resulting polymer are not impaired. Suitable examples of monocyclic olefins are cyclobutene, cyclopentene, cyclooctene, cyclododecene, and the like.

Metathesis Catalyst System

Any known metathesis catalyst suitable for the ring-opening polymerization of norbornene type monomers can be employed in this invention (see, for example, Japanese Kokai application Nos. 58-127728, 58-129013, 59-51911, 60-79035, 60-186511, and 61-126115).

Examples of suitable metathesis catalysts are the halides, oxyhalides, oxides, organic ammonium salts of tungsten, molybdenum, tantalum, and the like. Examples of suitable cocatalysts are alkylaluminum halides, alkoxyalkylaluminum halides, aryloxyalkylaluminum halides, organotin compounds, and the like.

The alkylaluminum halides, when employed, tend to initiate premature polymerization of the monomer solution. In addition, if a glass fiber filler is used, the impregnation of glass fiber with the monomer solution must be sufficient. For these reasons a reaction solution with a longer pot life must be employed (i.e., longer than five minutes at 30° C., preferably longer than 10 minutes). In these situations, polymerization can be retarded (i.e. pot life can be extended) by the addition of ethers, ketones, nitriles, alcohols, and the like as disclosed in Japanese Kokai application No. 61-120814.

In addition to the catalyst and cocatalyst, an activating agent can be employed as disclosed in Japanese Kokai application No. 60-79035. Halohydrocarbons such as chloroform, carbon tetrachloride, hexachloropentadiene, or metal halides such as silicon tetrachloride, germanium tetrachloride, and lead tetrachloride can be used.

The amount of metathesis catalyst employed ranges from about 0.01 to about 50 mmol, preferably about 0.1 to about 10 mmol per mole of norbornene based monomer utilized. The amount of cocatalyst utilized ranges from about 0.1 to about 200 mole ratio based on the catalyst component, preferably in the 2 to 10 (mole ratio) range.

Preferably, the metathesis catalyst and cocatalyst are dissolved in the monomer. So long as product quality is not affected, the catalyst and cocatalyst can be suspended or dissolved in a solvent before introduction into the monomer.

Additives

The product polymer properties of the outer layer can be modified by the addition of additives such as antioxidants, filler materials, strengthening materials, pigments, coloring agents, foaming agents, flame retardants, lubricants, elastomers, and/or dicyclopentadiene type hydrogenated thermopolymer resins. The additives can be added to either one or both reactant solutions, or may be added to a third reactant solution.

Suitable antioxidants include phenolic, phosphorus, or amine type compounds that are commonly used in plastics and rubbers.

Suitable fillers include inorganic materials such as milled glass, long glass fibers, glass mat, carbon black, talc, calcium carbonate, mica, and the like. Reinforcing fibers can be used in this invention to strengthen the outer layer.

Suitable elastomers include natural rubber, polybutadiene, polyisoprene, styrene-butadiene copolymer (SBR), styrene-butadiene-styrene block copolymer (SBS), styrene-isoprene-styrene block copolymer (SIS), ethylene-propylene-diene terpolymer (EPDM), ethylene-vinyl acetate copolymer (EVA), and their hydrogenated derivatives. The addition of the elastomer to the reactant solution(s) improves reactant solution viscosity as well as the impact properties of the molded composite product.

EXAMPLE 1

A polyurethane foaming formulation (Asahi Denka Sha, Adeka Foam Mix; a polyol and isocyanate mixture) was conveyed into an aluminum mold having a cavity measuring 545 mm×545 mm×30 mm. After 15 minutes, a foam core of the above described cavity, dimension was obtained. The foam core had a foaming ratio of about 10, a density of 0.12 g/cm$^3$, and it had a skin on its periphery.

An aluminum sheet measuring 100 mm×250 mm×3 mm was inserted into each end of the foam core as a spacer jig. A 100 mm×100 mm section of the spacer jig extended out from each end of the foam core.

The foam core with supporting spacer jigs was placed in a mold having a cavity measuring 550 mm×550 mm×40 mm. On the lower mold half, a gap equivalent to the spacer jig thickness was formed, so that when the upper and lower mold halves were mated, a gap was formed between the foam core and the mold cavity wall.

A reaction solution was formulated by mixing 100 parts dicyclopentadiene (DCP) and 6.5 parts styrene-isoprene-styrene block copolymer (SIS) (Quintac 3421, Nippon Zeon Co., trade name). The reaction solution was divided into equal portions and placed into two containers. In one container, 41 mmole of diethylaluminum chloride (DEAC), 41 mmole of n-propyl alcohol, and 21 mmole of silicon tetrachloride per 100 parts DCP were added (solution A).

In the other container, 10 mmole tri(tridecyl) ammonium molybdate/100 parts DCP were added. 4 parts/100 parts dicyclopentadiene of a phenolic type antioxidant (Ethanox 702, Ethyl Corp.) were also added (solution B).

The two reactant solutions (solution A/solution B, mixing ratio: 1/1) were rapidly injected under atmospheric pressure into the above-mentioned mold (preheated to 60° C.) through an injection port in the bottom of the mold via a gear pump and power mixer. After the injection, the mixed reactive solution was allowed to polymerize for three minutes to give a large integrally molded composite product having a DCP outer layer.

The composite molded product so obtained had no voids, indentations, or bumps, and had a smooth surface. In addition, the product did not have a wavy surface.

EXAMPLE 2

For comparison, a large plate-like composite molded product was prepared by the procedure given in Example 1, except that a polyurethane foam core with a foaming ratio of about 20 and a density of about 0.06 g/cm$^3$ was used.

The resulting composite molded product had a wavy pattern in its center and its surface was not smooth and flat. The product was cut and the cross section was examined. The adhesion of the core to the outer layer was so weak that the outer layer was easily peeled off.

EXAMPLE 3

Again for comparison, a large composite product was prepared by the procedure given in Example 1, except that the polyurethane foam core was cut from a block (i.e., skinless).

The resulting composite molded product had a bumpy surface.

EXAMPLE 4

An aluminum support member measuring 450 mm×650 mm×1 mm was placed into a mold cavity (made from unsaturated polyester) measuring 480 mm×680 mm×40 mm. A polyurethane foam formulation (Asahi Denka Co, Adeka Foam Mix; polyol and isocyanate mixture) was injected into the mold cavity. After five minutes, a hard polyurethane foam molded product was formed. The resulting foam material had a foaming ratio of about 10, a density of 0.12 g/cm$^3$, and a skin layer on its periphery.

To each corner of the reinforced foam core a polyethylene spacer (dimensions: 20 mm diameter×5 mm height) was bonded with an adhesive. The foam core was placed in a mold cavity measuring 500 mm×700 mm×50 mm. The mold was preheated to 60° C. and held vertically. The same reaction solution formulation as set forth in Example 1 (see, solution A/solution B, mixing ratio: 1/1) was rapidly injected into the mold via a gear pump and power mixer under atmospheric pressure. After the injection, the solution was allowed to polymerize for three minutes giving a reinforced integrally molded composite. The resulting composite product had no surface defects.

EXAMPLE 5

For comparison, the same procedure set forth in Example 4 was followed, except that the support member was not buffered with a foam core.

The resulting composite molded product had surface cracks. The apparent cause was the difference in the shrinkage coefficients of the DCP resin and the aluminum support member.

EXAMPLE 6

A polyurethane foam core of the same material, dimensions and properties as set forth in Example 1 was prepared using the same procedure as in Example 1.

An aluminum extension member measuring 100 mm×250 mm×3 mm and having a fastening aperture (diameter 10 mm) on one end was inserted into each end of the foam core in such a way that the end with the fastening aperture extended out of the foam core. The inserted extension member protruded out of the foam core so that a 100 mm section was visible.

The foam core with extension members was placed in a mold cavity measuring 550 mm×550 mm×40 mm in the same manner as set forth in Example 1. A reactive solution of the same formulation and amounts as set forth in Example 1 was conveyed to the mold and polymerized as disclosed therein.

The obtained integrally molded composite product had no voids, indentations, bumps, and the surface thereof was smooth. In addition, the product did not have a wavy surface. The extension members were completely integrated with the composite structure and did not come off when pulled.

What is claimed is:

1. An integrally molded composite comprising a core member and a polynorbornene outer layer, said core member comprising a low foaming ratio plastic foam having an integrally formed skin on substantially the surface thereof, said core member being encapsulated by said outer polynorbornene layer and said outer polynorbornene layer comprising at least one norbornene-type monomer that is bulk polymerized via metathesis ring-opening bulk polymerization around said core member.

2. The integrally molded composite as set forth in claim 1 wherein a support member is located within said core and encapsulated thereby to provide reinforcement.

3. The integrally molded composite as set forth in claim 2 wherein said support member has at least one extension that protrudes outwardly from said core member and through said outer layer, and said extension having a distal end portion having fastening means thereon.

4. The integrally molded composite as set forth in claim 1 wherein an extension member is located within said core extending outwardly therefrom and protruding through said outer layer defining a distal end portion and said distal end portion having fastener means thereon.

5. The integrally molded composite of claim 1 wherein said core member has a foaming ratio of about 5 to about 15.

6. The integrally molded composite of claim 1 wherein said core member comprises a polymer selected from the group consisting of polyurethanes, polyethylenes, polypropylenes, polystyrenes, ureas, thermosetting acrylic polyimides and polyvinyl chloride.

7. The integrally molded composite of claim 1 wherein said norbornene monomer is selected from the group consisting of norbornene, norbornadiene, dicyclopentadiene, dihydrodicyclopentadiene, tetracyclododecene, tricyclopentadiene tetradicyclopentadiene and mixtures thereof, and the alkyl, alkylidene, aryl and polar derivatives thereof.

8. The integrally molded composite of claim 7 wherein said norbornene monomer is selected from the group consisting of 5-methyl-2-norbornene, 5-ethyl-2-norbornene, 5-butyl-2-norbornene, 5-hexyl-2-norbornene, 5-ethylidene-2-norbornene, 5-vinyl-2-norbornene, 5-phenylnorbornene, methyltetracyclododecene, ethyltetracyclododecene, dimethyltetracyclododecene, ethylidenetetracyclododecene and mixtures the thereof.

9. The integrally molded composite of claim 1 wherein said norbornene type monomer further comprises a metathesis catalyst, cocatalyst, and activating agent.

10. The integrally molded substrate of claim 9 wherein the catalyst is selected from the group consisting of organic ammonium salts of tungsten and molybdenum.

11. An integrally molded composite comprising a core member and a thermosetting polynorbornene outer layer, said core member being a polyurethane foam having a forming ratio of 5 to 15 and having an integrally formed skin on the periphery thereof, said core member being encapsulated by said polynorbornene outer layer and said outer layer comprising at least one cross-linking norbornene type monomer that is bulk polymerized via metathesis ring-opening polymerization about said core member.

12. The integrally molded product of claim 11 wherein said norbornene type monomer is tricyclic or higher and contains at least two reactive double bonds suitable for a cross-linking reaction.

13. The integrally molded composite of claim 12 wherein said norbornene type monomer is selected from dicyclopentadine, tricyclopentadiene, tetracyclopentadiene, and mixtures thereof.

14. The integrally molded composite of claim 11 wherein said core member is reinforced with a support member.

15. The integrally molded composite of claim 14 wherein said support member has at least one extension that protrudes outwardly from said core member and through said outer layer, and said extension having a distal end portion having fastening means thereon.

16. The integrally molded composite as set forth in claim 11 wherein an extension member is located within said core extending outwardly therefrom and protruding through said outer layer defining a distal end portion and said distal end portion having fastener means thereon.

17. The integrally molded composite of claim 11 wherein said polynorbornene outer layer is reinforced with reinforcement fibers.

* * * * *